Patented Dec. 26, 1944

2,366,102

UNITED STATES PATENT OFFICE 2,366,102 p-OXAZINYLMETHYL-BENZODIOXANE AND A PROCESS FOR THEIR MANUFACTURE

Adolf Grün, Basel, Switzerland, assignor to the Swiss firm of J. R. Geigy A. G., Basel, Switzerland No Drawing. Application February 5, 1943, Serial No. 474,874. In Switzerland January 7, 1942

4 Claims. (Cl. 260—247)

It has been found that by the interaction of p-oxazine (morpholine) with esters of the 2-hydroxymethyl-benzo-1:4-dioxane there is obtained a base which—preferably in form of a salt or double salt—is therapeutically active and shows new and additional effects or applicability respectively. Esters of inorganic acids, such as of hydrochloric and hydrobromic acid, of sulfuric and phosphoric acid, as well as esters of organic acids, e. g. of arylsulfonic acids, may be used. Their preparation is carried out according to usual methods from the acids or their halides and hydroxymethyl-benzodioxane. This intermediate product may be produced from pyrocatechine and epichlorhydrine by heating or melting the same under pressure with potassium hydroxide (Lindemann, Ber. 24, 2149; Fourneau, Z pharm. [7] 198, [8] 18, 185) or from diosodium pyrocatechinate with dibromopropyl alcohol (Moureu, Comptes Rendus 126, 1427; Annales de Chimie [7] 18, 93). It is however more advantageous to intermix without heating an alkaline pyrocatechine solution with glycerine-epichlorhydrine (or epibromhydrine).

It is already known that tertiary amines are obtained by reacting 2-chloromethyl-benzodioxane with secondary amines such as dimethylamine, piperidine and the like. The said tertiary amines, however, are primarily characterized by a sympathicolytic effect. On the other hand, the oxazinyl derivative shows a greater range of activity; it has valuable narcotic, hypnotic and analgetic properties and exhibits less or no disturbing by-effects respectively. Moreover the oxazinyl derivative is applicable in any form of application.

The present invention is illustrated by the following example without being limited thereto. The parts are by weight.

Example

Equal parts of 2-chloromethyl-benzo-1:4-dioxane, morpholine and benzene are heated in the autoclave for 10–12 hours to about 150° C. The bases are extracted from the solution by means of diluted sulfuric acid and, after having separated little residues of neutral substance by shaking out with organic solvents, the bases are again precipitated in the cold by means of sodium carbonate. The morpholine not consumed is separated by washing out or distillation and then regenerated. Thus the nearly pure product is obtained in yields of 85–95%.

Instead of the chlorine compound the equivalent quantity of the bromine compound, i. e. about 125 parts instead of 100 parts of the chlorine derivative, may be used; in this case a lower temperature may be employed. Likewise hydroxymethyl-benzodioxane esters of organic acids can be used. By recrystallisation or fractionation in vacuo 2-p-oxazinylmethyl-5:6-benzo-1:4-dioxane is obtained in a pure form; white crystals; M. P. 77° C.; B. P. 153° C. at 1 mm. pressure. The base gives well crystallising salts, e. g. the hydrochloride, which melts at 212° C.

The benzodioxane derivative serving as starting material may be prepared as follows:

To a cold solution of 220 parts of pyrocatechine in 930 parts of about 12% caustic potash lye are added 225 parts of epichlorhydrine and the mixture is then vigorously shaken, whereupon the reaction takes place after a short time with self-heating. Shaking is continued without heating until the alkali is practically nearly completely consumed, then the reaction product thus precipitated is separated from the upper solution, purified by washing, drying and distilling.

Thus 270–280 parts of the hydroxymethyl compound are obtained in form of white crystals having a melting point of 86° C. and a boiling point of 154°–155° C. at 12 mm. pressure. By boiling with concentrated hydrobromic acid and by separation of the remaining quantities of the non-converted product by means of benzine or the like the bromomethyl compound, a colorless liquid, is obtained; boiling point 126°–127° C. at 0.9 mm. pressure; by treatment with thionylchloride the chloromethyl compound (B. P. 15 mm. 131.5°)

is produced. The chlorides of polybasic acids such as of phosphoric acid, sulfuric acid and the like give in a corresponding proportion of quantities the acid esters, while the chlorides of arylsulfonic acids such as of toluene sulfochloride react likewise in the known manner. The yields of the halogen derivatives amount up to 90% and above.

What I claim is:

1. A process for the manufacture of 2-p-oxazinylmethyl-5:6-benzo-1:4-dioxane by interacting morpholine with an ester of 2-hydroxymethyl-benzodioxane.

2. A process for the manufacture of 2-p-oxazinylmethyl-5:6-benzo-1:4-dioxane by interacting morpholine with a 2-halogenomethyl-benzodioxane.

3. A process for the manufacture of 2-p-oxazinylmethyl-5:6-benzo-1:4-dioxane by interacting morpholine with 2-chloromethylbenzodioxane.
4. The 2-p-oxazinylmethyl-5:6-benzo-1:4-dioxane of the formula
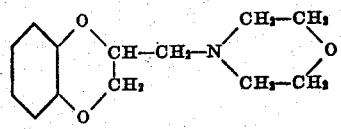
being white crystals of the melting point 77° C. and the boiling point 153° C. at 1 mm. pressure, showing valuable narcotic, hypnotic and analgetic properties.
ADOLF GRÜN.